Dec. 19, 1939.　　　　　H. N. RASCH　　　　　2,183,693
DOUGH CUTTING MACHINE
Filed Sept. 19, 1938　　　2 Sheets-Sheet 1
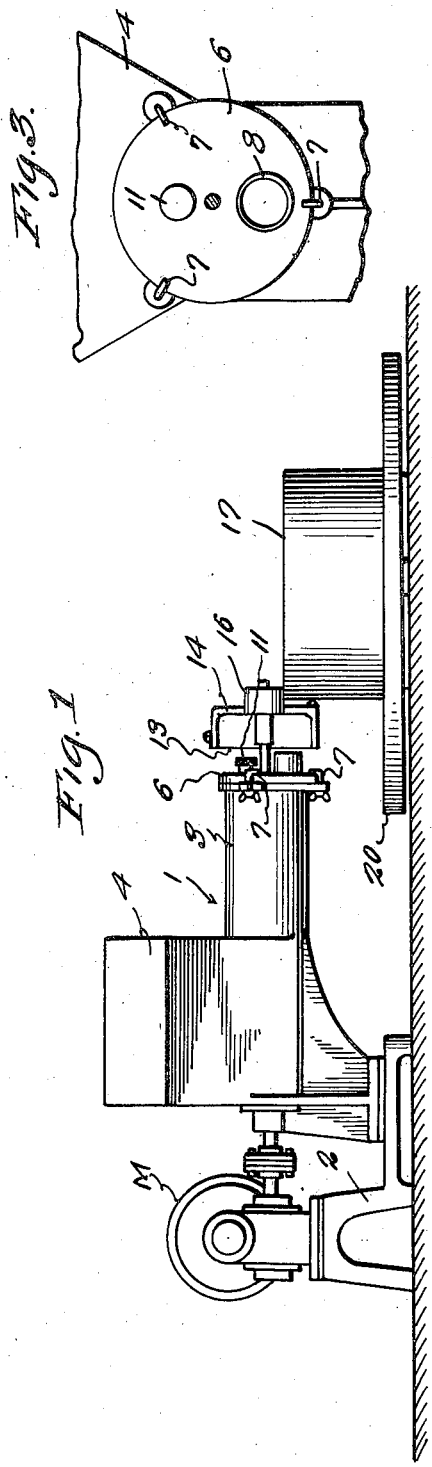
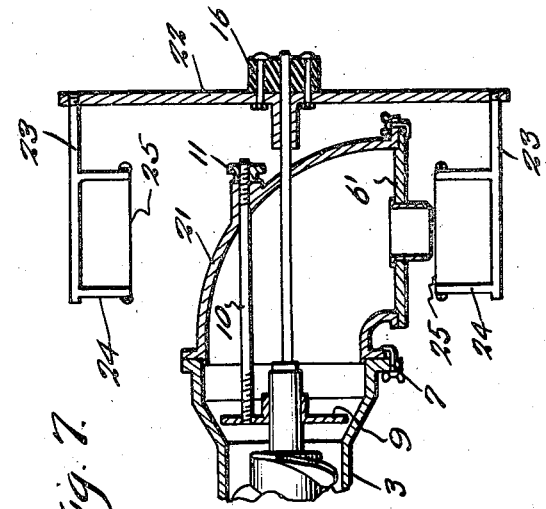
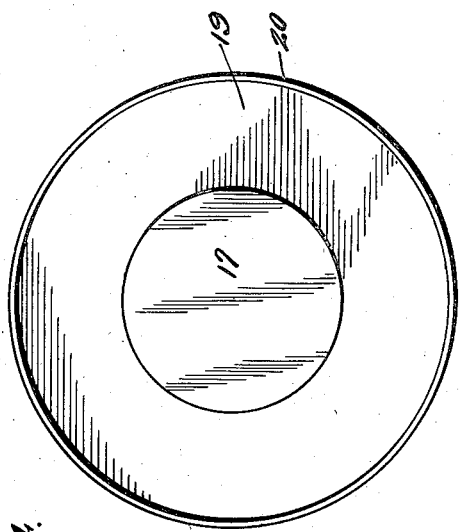
Inventor
H. N. Rasch
By L. B. James
Attorney

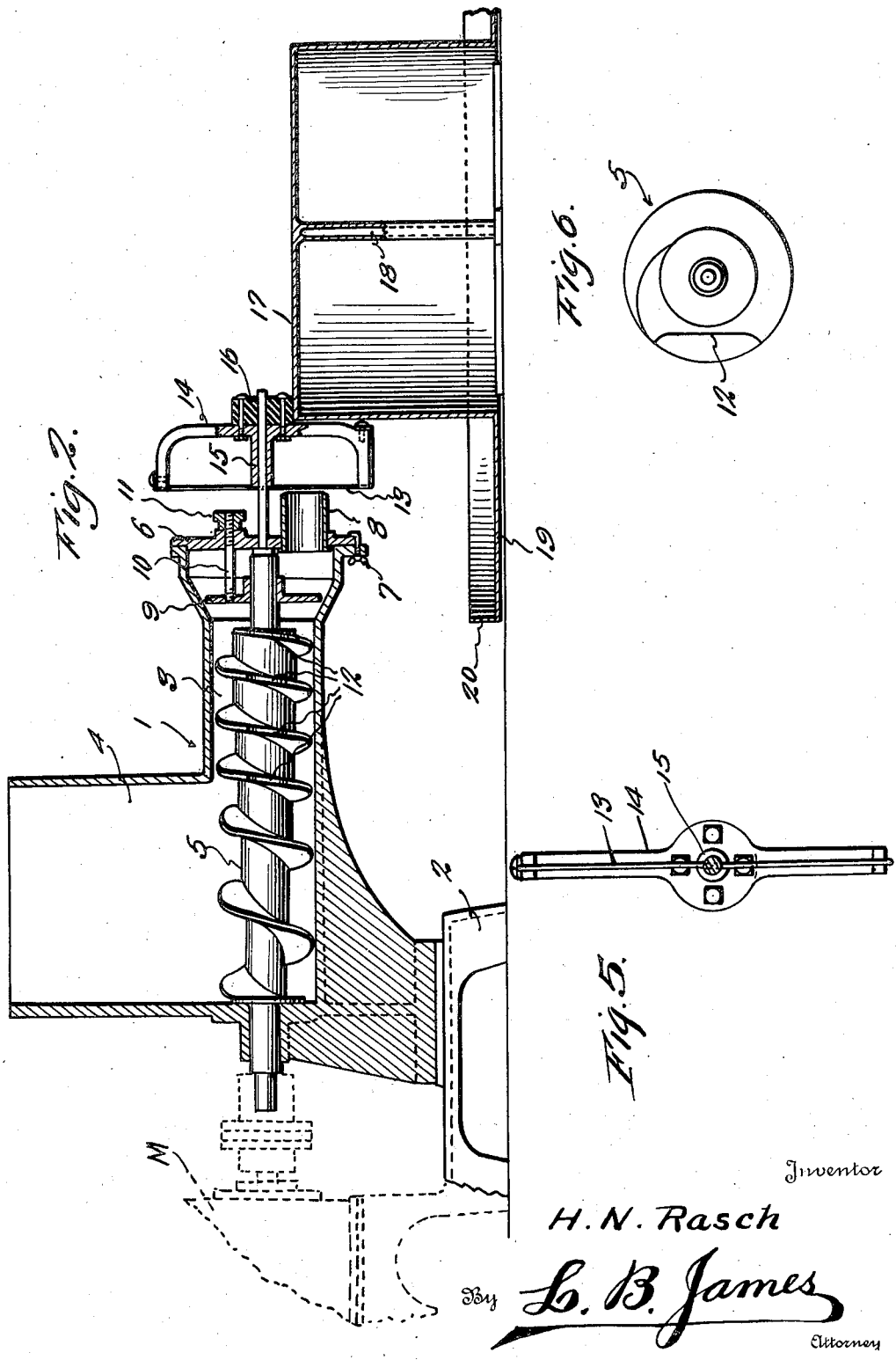

Patented Dec. 19, 1939

2,183,693

UNITED STATES PATENT OFFICE 2,183,693

DOUGH CUTTING MACHINE

Henry Nicklous Rasch, Milwaukee, Wis.

Application September 19, 1938, Serial No. 230,710

1 Claim. (Cl. 107—14)

This invention relates to a cookie cutter, the general object of the invention being to provide a spiral conveyor for feeding dough from a hopper through a die, with means for cutting the dough leaving the die into slices to form the cookies.

Another object of the invention is to provide means for regulating the amount of dough passing through the die to control the size of the cookies being formed.

The invention also consists in certain other features of construction, combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Fig. 1 is an elevation of the invention.

Fig. 2 is a vertical sectional view taken longitudinally of the device.

Fig. 3 is a view looking towards the delivery end of the device with the cutting means omitted.

Fig. 4 is a top plan view of the receiving member.

Fig. 5 is a view of the cutter.

Fig. 6 is an end view of the spiral conveyor.

Fig. 7 is a sectional detail view showing a modification.

In these drawings, the numeral 1 indicates the body of the device which is supported by a part of the base 2, the body forming the horizontal cylinder 3 and the hopper 4. A spiral conveyor 5 is rotatably arranged in the cylinder and the lower part of the hopper and has its front end journaled in the front end of the body and said end is suitably connected to a motor M, handle or other suitable source of power capable of rotating the conveyor. The other end of the conveyor shaft is reduced and passes through a removable end cover 6, held in place by suitable fasteners 7. A die or barrel 8 passes through a hole in the cover 6 and various sizes and shapes of dies or barrels can be provided for the device to make the cookies of different sizes and shapes. A control plate or valve 9 is slidably arranged on the rear part of the conveyor shaft and is adjusted by a screw 10 threaded through a hole in the cover and having a nut 11 on its outer end. The thread of the conveyor is formed with the recesses 12. This plate or valve regulates the amount of dough passing through the die or barrel and controls the size of the cookies and the recesses in the worm or conveyor allows the dough to be retarded by the plate. The dough passing from the die or barrel is cut into slices by the wire knife 13 carried by the yoke 14 which is formed with a bushing 15 through which the extended part of the conveyor shaft passes and a resilient wheel 16 is fastened to the yoke and the shaft so that the yoke and the wheel revolves with the conveyor, it being understood that any approved type of knife may be substituted for the knife 13. A drum 17 is rotatably arranged on a vertical shaft 18 and is engaged by the wheel 16 to impart a rotatory motion thereto. The drum has a ring shaped plate 19 attached to its lower end and said plate is formed with a flange 20, the slices cut by the knife falling upon the plate or removable trays placed thereon and the rotating drum and its plate carry the slices or cookies from under the knife to a point where they can be readily picked up and placed in the baking oven.

Where it is not desirable to have the slices or cookies fall as far as they will in the construction shown in Figs. 1 and 2, an elbow 21 can be attached to the rear end of the cylinder, as shown in Fig. 7 and the end plate 6' is placed on the lower end of said elbow, the plate, of course, carrying the die. In this form of the invention, a disk 22 is used instead of the yoke and arms 23, extend forwardly from the disk and carry the supports 24 for the wire knives 25, the parts being so arranged that as a knife passes under the die it will cut a slice from the dough being forced through the die.

Thus it will be seen that the dough placed in the hopper will be forced by the worm or conveyor through the die or barrel and the knife will cut the dough into slices to form the cookies, the sizes of the cookies being controlled by adjusting the plate 9.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A device of the class described comprising a cylinder, a hopper at one end of the cylinder, a spiral coveyor in the cylinder and passing through the lower end of the hopper, means for rotating the conveyor, a barrel at the rear end of the cylinder through which the dough is forced by the conveyor, a knife for cutting the dough into slices as it passes from the barrel and means for regulating the flow of dough through the barrel such means including an enlarged rear end of the cylinder, a plate movable therein, means for adjusting the plate longitudinally of the cylinder and said conveyor having recesses in its threads.

HENRY NICKLOUS RASCH.